(12) United States Patent
Cundiff et al.

(10) Patent No.: US 10,891,574 B2
(45) Date of Patent: Jan. 12, 2021

(54) PLANOGRAM RESETTING USING AUGMENTED REALITY IN A RETAIL ENVIRONMENT

(71) Applicant: Target Brands, Inc., Minneapolis, MN (US)

(72) Inventors: Daniel Mark Cundiff, Evansville, IN (US); Joshua James Beck, Minneapolis, MN (US)

(73) Assignee: TARGET BRANDS, INC., Minneapolis, MN (US)

( * ) Notice: Subject to any disclaimer, the term of this patent is extended or adjusted under 35 U.S.C. 154(b) by 609 days.

(21) Appl. No.: 14/943,609

(22) Filed: Nov. 17, 2015

(65) Prior Publication Data
US 2017/0140314 A1 May 18, 2017

(51) Int. Cl.
| | |
|---|---|
| *G06F 1/16* | (2006.01) |
| *G06Q 10/06* | (2012.01) |
| *G06T 19/00* | (2011.01) |
| *G06T 19/20* | (2011.01) |
| *G06Q 30/06* | (2012.01) |
| *G06Q 10/08* | (2012.01) |

(52) U.S. Cl.
CPC ....... *G06Q 10/0637* (2013.01); *G06Q 10/087* (2013.01); *G06Q 30/0639* (2013.01); *G06Q 30/0643* (2013.01); *G06T 19/006* (2013.01)

(58) Field of Classification Search
CPC .. G06Q 10/087; G06Q 30/0639; G06F 3/147; G09G 2340/0492; G09G 2340/10; G09G 2340/12; G09G 2354/00
USPC ............................................ 345/633; 705/28
See application file for complete search history.

(56) References Cited

U.S. PATENT DOCUMENTS

| | | | |
|---|---|---|---|
| 2008/0043013 A1 | 2/2008 | Gruttadauria et al. | |
| 2008/0147475 A1 | 6/2008 | Gruttadauria | |
| 2012/0249588 A1 | 10/2012 | Tison et al. | |
| 2013/0119138 A1* | 5/2013 | Winkel | G06Q 10/087 235/462.1 |
| 2014/0003729 A1 | 1/2014 | Auclair et al. | |
| 2014/0195302 A1 | 7/2014 | Yopp et al. | |
| 2014/0201040 A1* | 7/2014 | Birch | G06Q 10/087 705/28 |
| 2014/0324642 A1* | 10/2014 | Winkel | G06Q 10/087 705/28 |
| 2015/0088703 A1 | 3/2015 | Yan | |
| 2015/0153571 A1 | 6/2015 | Ballard et al. | |
| 2015/0317682 A1* | 11/2015 | Kayser | G01G 19/4144 705/14.55 |

(Continued)

OTHER PUBLICATIONS

Business Wire, "Epson Brings Enterprise Applications to Life with Latest Augmented Reality Smart Glasses at Augmented World Expo 2014," Business Wire, May 23, 2014, 2 pp.

*Primary Examiner* — Jin Cheng Wang
(74) *Attorney, Agent, or Firm* — Nixon & Vanderhye P.C.

(57) ABSTRACT

Augmented reality may be used to facilitate a planogram (POG) reset in a retail environment. The system may include a location benchmark positioned adjacent a retail display, and a display generator located relative to the location benchmark. The display generator may display an image corresponding to the POG reset on the retail display. A control processor may drive the display generator to display the image, and a data source may provide control signals to the control processor based on pre-stored POG data.

18 Claims, 3 Drawing Sheets

(56) References Cited

U.S. PATENT DOCUMENTS

2016/0088268 A1*  3/2016  Durham .................. H04N 9/31
                                                    345/173
2016/0110902 A1*  4/2016  Chirakansakcharoen ..................
                                                    G01G 19/4144
                                                    345/633

* cited by examiner

PLANOGRAM RESETTING USING AUGMENTED REALITY IN A RETAIL ENVIRONMENT

CROSS-REFERENCES TO RELATED APPLICATIONS (Not Applicable)

STATEMENT REGARDING FEDERALLY SPONSORED RESEARCH OR DEVELOPMENT (not Applicable)

BACKGROUND OF THE INVENTION

The invention relates to planogram resets in a retail environment and, more particularly, to facilitating a planogram reset using augmented reality.

Retail stores use planograms (POGs) to instruct team members in setting up retail displays. A POG reset, however, can be a tedious and time consuming process. Currently, a team member receives written instructions on where to put the shelves and pegs on the POG. Planograms are also used to assist team members in stocking products on the retail displays. The POG may cover an area that is three square feet. The instructions may be listed like: 10 peg holes over and 23 peg holes down, place the peg (or start a shelf). Depending on the team member's experience and the complexity of the POG design, this process could take eight hours or more.

More specifically, the time it takes to reset a POG depends on how experienced the team member is and how complex the reset is. If a team member was resetting an area that has many skus, such as pens/pencils or cosmetics, it may take an employee eight hours or more if the team member is working by themselves. Other areas with shelving and with larger items and fewer skus, such as tents or coolers, may only take about three hours.

The schematics tell the team member details on peg/shelf/ product height and location. Team members with more experience may be able to read the instructions more quickly. There are existing tape measures that team members can use with letters and numbers to attempt to help speed up the reset process, but these tape measures require positioning and set-up and only marginally improve the reset time.

BRIEF SUMMARY OF THE INVENTION

Preferred embodiments of the invention utilize augmented reality to reduce the time for a POG reset. A display generator such as an LED projector or the like can be positioned in an aisle near a retail display and may generate an image corresponding to the POG reset on the retail display. With the image on the display, team members can perform the POG reset without requiring tedious and time-consuming counting of peg holes and the like. The system is also suitable for stocking pegs and shelves in the retail environment.

In an exemplary embodiment, a system uses augmented reality to facilitate a planogram (POG) reset in a retail environment. The system may include a location benchmark positioned adjacent a retail display, and a display generator located relative to the location benchmark. The display generator may display an image corresponding to the POG reset on the retail display. A control processor communicating with the display generator may drive the display generator to display the image, and a data source, which may be a computer device, communicating with the control processor may provide control signals to the control processor based on pre-stored POG data.

In another exemplary embodiment, the system may include a data source storing POG data and outputting control signals corresponding to the POG data, a control processor receiving the control signals from the data source, and a display generator driven by the control processor to display an image corresponding to the POG reset on the retail display. The image on the retail display may include at least one of peg indicators positioned over peg holes on the retail display that receive a peg, shelf indicators positioned over peg holes or shelf slots on the retail display that receive a shelf, and product indicators positioned adjacent pegs or shelves that identify product locations on the pegs or shelves, respectively.

In still another exemplary embodiment, a method of resetting a retail display in a retail environment according to a POG reset using augmented reality may include the steps of positioning a display generator adjacent a retail display; providing control signals from a data source to a control processor based on pre-stored POG data; driving the display generator with the control processor; the display generator displaying an image corresponding to the POG reset on the retail display; and placing at least one of pegs and shelves on the retail display in accordance with the image displayed on the retail display.

BRIEF DESCRIPTION OF THE DRAWINGS

These and other aspects and advantages of the invention will be described in detail with reference to the accompanying drawings, in which.

DETAILED DESCRIPTION OF THE INVENTION

Embodiments of the present invention utilize augmented reality to reduce the time for a POG reset. Augmented reality is technology that superimposes a computer-generated image on a user's view of the real world, thus providing a composite view. Augmented reality integrates digital information with live video or a user's environment in real time. Basically, augmented reality takes an existing picture and blends new information into the existing picture to create an enhanced, or augmented, picture.

Figure 1:
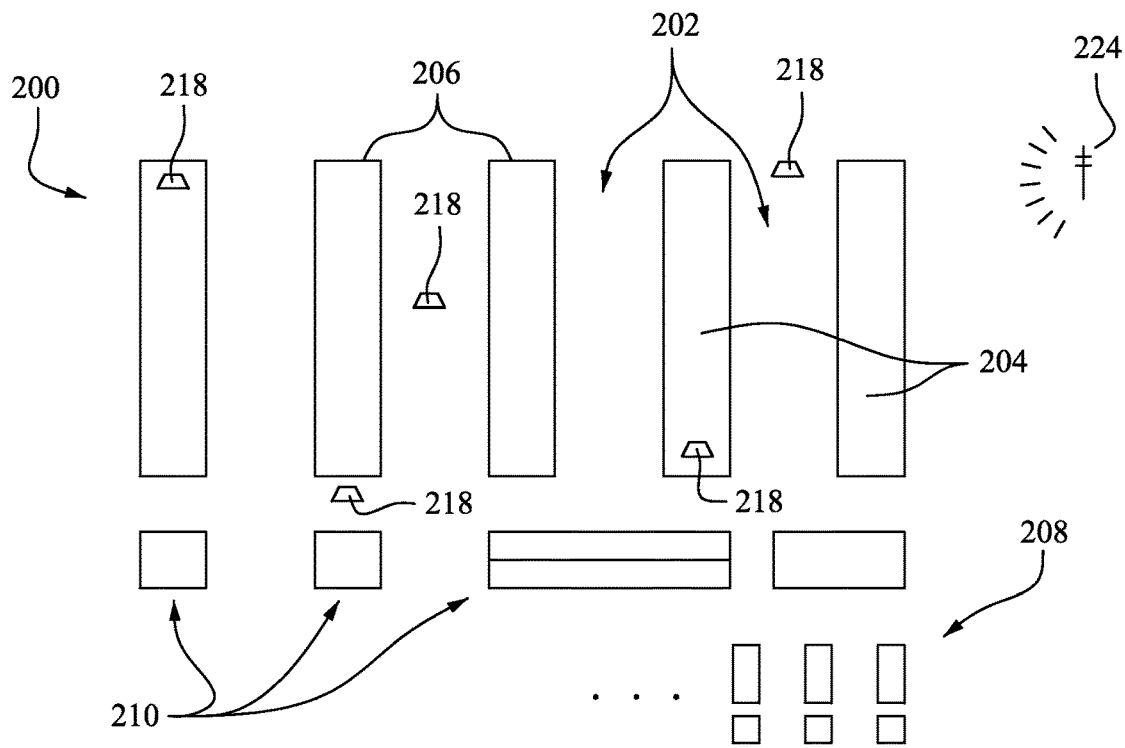
FIG. 1 is an overview of an exemplary retail environment.

In some examples, with reference to FIG. 1, a retailer is an entity that provides services or retails merchandise through physical, tangible, non-Internet-based retail stores or through Internet-based stores. In the case of a retailer that sells products and services through physical, tangible, non-Internet-based retail stores, each store of the retailer can include retail floor space 200 including a number of aisles 202. Each of the aisles can have shelf and/or rack space 204 for displaying merchandise. In some stores, at least some of the aisles have end caps 206 for displaying additional merchandise. Each of the stores includes one or more checkout lanes 208 with cash registers at which customers may purchase merchandise. In some examples, the checkout lanes 208 are staffed with cashiers. Some stores also include additional tables or bins 210 with specials or clearance items. In general, vendors include entities, such as other retailers or suppliers, from which the retailer receives merchandise or services, either directly or indirectly. As used herein, the term "merchandise" broadly refers to any tangible item or service that a retailer provides to a customer.

Figure 2:
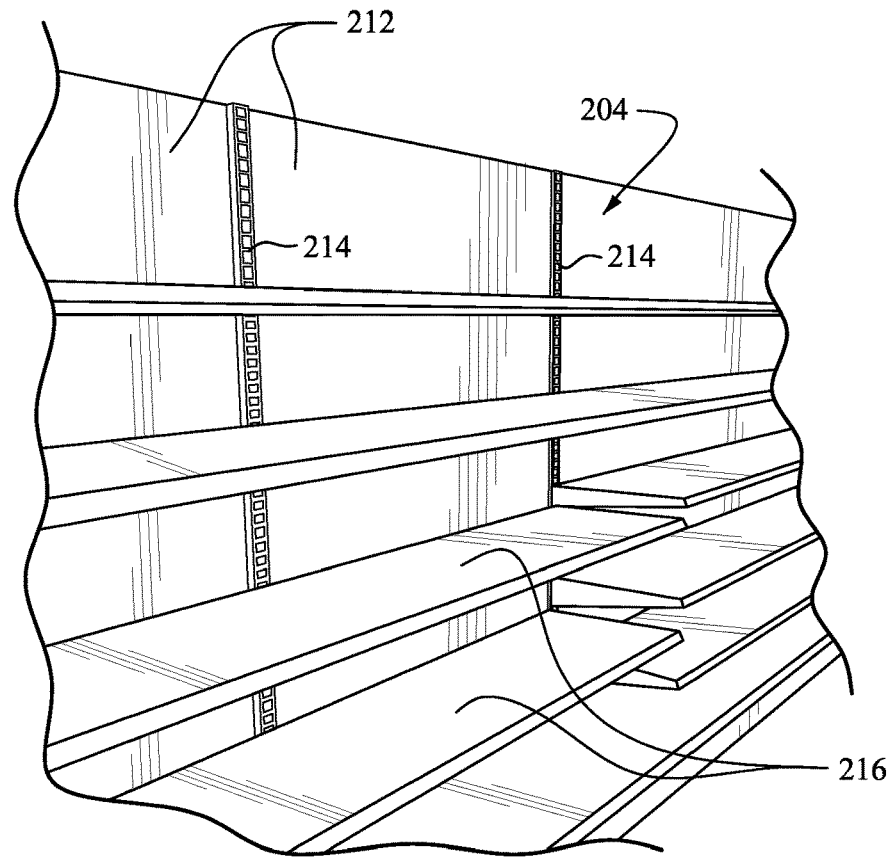
FIG. 2 shows a retail display ready for a POG reset.

FIG. 2 is an exemplary view of the shelf and/or rack space 204 for displaying merchandise. The space 204 is generally provided with a plurality of peg boards 212 including peg holes separated by shelf supports 214. As is well known, the peg holes can be used for supporting peg hooks on which suitably sized merchandise is displayed, and the shelf supports 214 can be used to support shelves 216 via brackets or the like that engage the shelf supports 214.

Existing POG reset instructions are generally narrative and identify specific peg holes for receiving peg hooks and/or specific shelf slots for receiving shelf brackets. Using these instructions, a POG reset can be a tedious and time-consuming process.

Figure 3:
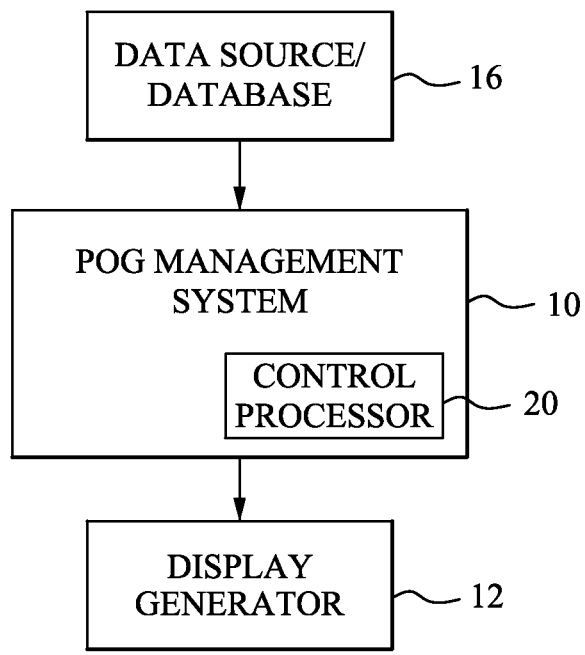
FIG. 3 is a block diagram illustrating an exemplary environment in which the techniques of this disclosure may be implemented.

FIG. 3 is a block diagram that illustrates an exemplary environment in which techniques of this disclosure may be implemented. As illustrated in the example of FIG. 3, the environment includes a POG management system 10, a display generator 12, and an external data source and/or database 16. The POG management system 10 includes a control processor 20. In other examples, the environment can include more, fewer, or different systems or components.

Figure 5:
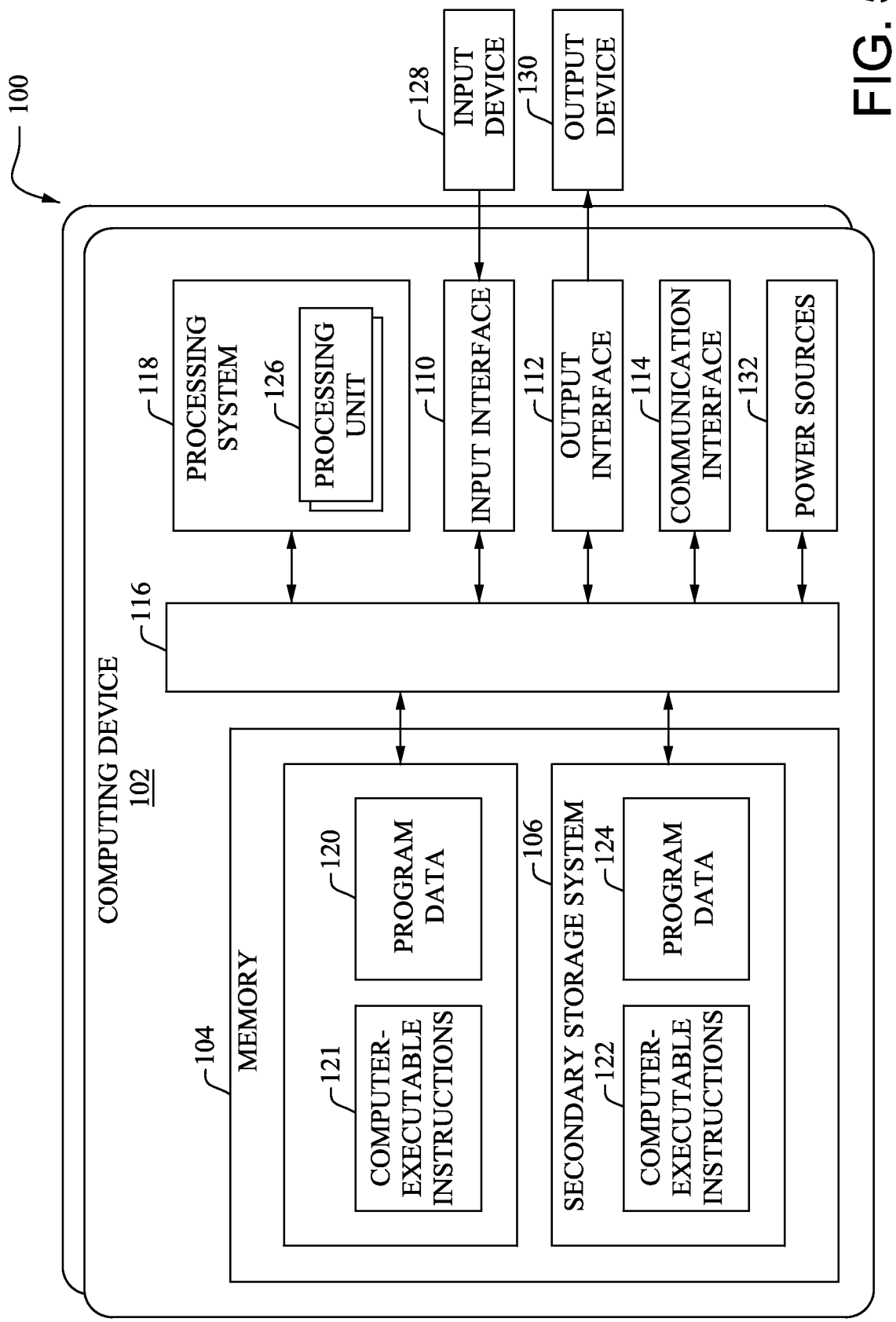
FIG. 5 is a block diagram of an exemplary configuration of a computer system in which the techniques of the disclosure may be implemented.

The POG management system 10 and the display generator 12 may be implemented in various ways. In one example, the POG management system 10 and the display generator 12 are implemented as one or more software systems executed by one or more computing devices. FIG. 5, described in detail below, illustrates an example computer system that executes a software system to implement the POG management system 10, display generator 12, and data source 16. Example types of computing devices include personal computers, laptop computers, mainframe computers, tablet computers, server computers, smartphones, workstation computers, and other types of electronic computing devices. In other examples, POG management system 10, display generator 12, and data source 16 are implemented as least in part using computing devices that have hardware specifically designed to implement the POG management system 10, display generator 12 and data source 16.

The POG management system 10 is configured to communicate with the display generator 12 and data source 16 in various ways. In one example, the POG management system 10 communicates with display generator 12 and data source 16 via one or more communication networks, such as local area networks (LANs), virtual private networks, or the Internet.

In use, the display generator 12 is positioned in the vicinity of a retail display to which the POG reset is being applied. Referring again to FIG. 1, the retail displays throughout the retail environment may include reference locators or location benchmarks 218 at various locations in the store. The location benchmarks 218 may include a keystone or the like positioned in an aisle in the retail environment. Alternatively or additionally, the location benchmarks 218 may include a marker in a corner of an aisle or at some other location in the aisle. The system can identify a location of the display generator 12 by identifying the location benchmark 218. That is, when the display generator 12 is positioned in an aisle for a POG reset, the system looks for and identifies the location benchmark 218 nearest the display generator. The retail environment may also include a location beacon 224 that can wirelessly identify a location of the display generator 12 in the store. The system can then identify an exact location of the display generator 12 and drive the appropriate POG reset for the particular retail display. Once the location is identified, the system accesses the database and/or data source to provide control signals to the control processor 20 based on pre-stored POG data. The control processor 20 communicates with the display generator 12 and drives the display generator to display an image corresponding to the POG reset on the retail display.

Exemplary display generators may include an LED projector, a laser light projector, a wearable device, or the like. Display generators of this type are known, and a detailed description of their use and operation will not be provided. In an exemplary application using a laser light apparatus, a laser overlay effect may be driven by the sequential activation of lasers so that the beams of light are directed in multiple directions toward the retail display creating a static image across a surface of the retail display. This effect has been created by prior art devices by either the use of a beam table, by the use of scanning projectors, or by other known technology.

In an exemplary known application, the control processor 20 receives control signals from the external source or database 16. Exemplary external sources include computers, hand held devices, and other devices that can provide signals over a suitable communications protocol. The control processor 20 processes the signals and provides corresponding output signals to the display generator 12 such as to laser heads in the beam table, scanning projector or other known technology.

Figure 4:
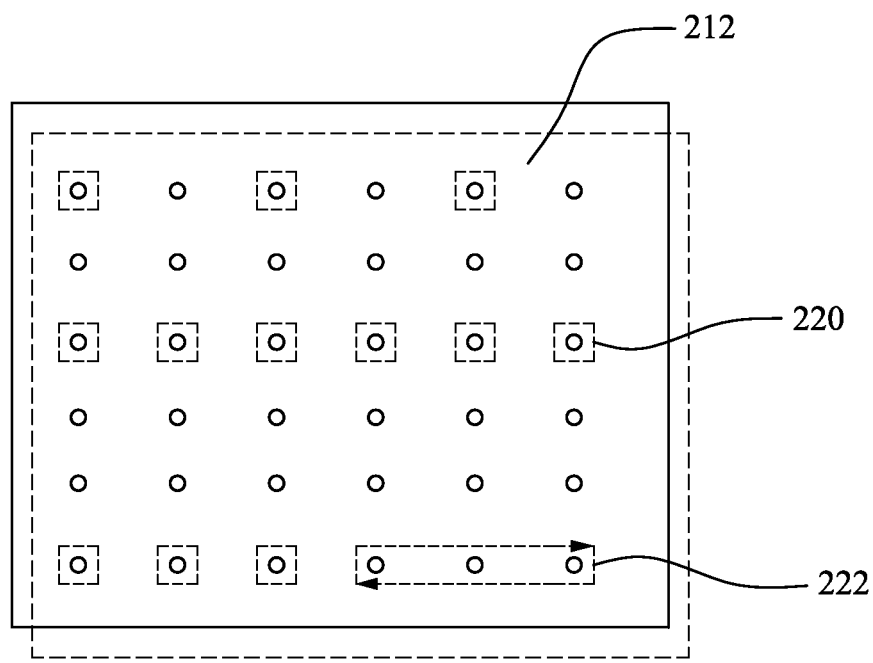
FIG. 4 is an exemplary retail display including an augmented reality image superimposed on the retail display.

FIG. 4 is an exemplary image output by the display generator 12 over the retail display. The image generated by the display generator is shown in dashed line. The image on the retail display may include one or more of peg indicators 220 positioned over peg holes on the retail display that are intended to receive a peg or peg hook. The image may also include shelf indicators 222 positioned over peg holes or shelf slots on the retail display that are intended for receiving a shelf. The display generator 12 thus projects an image directly onto the retail display to show the team members where pegs and shelves are to be placed for the POG reset.

Once the system identifies the location of the display generator 12 in the retail environment, the system accesses the POG reset data for the particular location and also adjusts the image display to fit the retail display. That is, the control processor 20 and the display generator 12 may modify the image based on a position of the detected marker 118 relative to the display generator 12 to fit the retail display. For example, if the display generator 12 is positioned off to the side of a retail display for a POG reset, the control processor 20 and the display generator 12 modify the image output to adjust for the offset projection. Similar adjustments are controlled by the control processor 20 and display generator 12 based on how close or how far the display generator 12 is to the retail display.

With a wearable device, the team member would see the image of FIG. 4 through a viewing device on the wearable product.

In some applications, the POG data is entered and processed using a computer system. The POG data identifies exact locations for pegs and/or shelves for the retail display, and the POG data is processed by the control processor 20 to drive the display generator 12. Any known computer configuration capable of carrying out the intended functionality of the preferred embodiments may be used. FIG. 5 is a block diagram of an example configuration of a computer system 100 in which the techniques of this disclosure may be implemented. In the example of FIG. 5, computer system 100 comprises a computing device 102 and one or more other computing devices. Computer system 100 or similar computing systems implement POG management system 10, display generator 12, and/or data source 16. Computing device 102 is an electronic device that processes information. In the example of FIG. 5, computing device 102 comprises a data storage system 104, a memory 108, a secondary storage system 106, a processing system 118, an input interface 110, an output interface 112, a communication interface 114, one or more power sources 132, and one or more communication media 116. Communication media 116 enable data communication between processing system 118, input interface 110, output interface 112, communication interface 114, memory 108, and secondary storage system 106. Computing device 102 can include components in addition to those shown in the example of FIG. 5. Furthermore, some computing devices do not include all of the components shown in the example of FIG. 5. Each of components 104, 106, 108, 110, 112, 114, 116, 118, 120, 121, 122, 124, 126, 128, 130, and 132 can be interconnected (physically, communicatively, or operatively) for inter-component communications.

Data storage system 104 is a system that stores data for subsequent retrieval. In the example of FIG. 5, data storage system 104 comprises memory 108 and secondary storage system 106. Memory 108 and secondary storage system 106 store data for later retrieval. In the example of FIG. 5, memory 108 stores computer-executable instructions 121 and program data 120. Secondary storage system 106 stores computer-executable instructions 122 and program data 124. Physically, memory 108 and secondary storage system 106 each comprise one or more computer-readable storage media.

A computer-readable medium is a medium from which a processing system can read data. Computer-readable media include computer storage media and communications media. Computer storage media can further include physical devices that store data for subsequent retrieval. Computer storage media are not transitory. For instance, computer storage media do not exclusively comprise propagated signals. Computer storage media include volatile storage media and non-volatile storage media. Example types of computer storage media include random-access memory (RAM) units, read-only memory (ROM) devices, solid state memory devices, optical discs (e.g., compact discs, DVDs, BluRay discs, etc.), magnetic disk drives, electrically-erasable programmable read-only memory (EEPROM), programmable read-only memory (PROM), magnetic tape drives, magnetic disks, and other types of devices that store data for subsequent retrieval. Communication media includes media over which one device can communicate data to another device. Example types of communication media include communication networks, communications cables, wireless communication links, communication buses, and other media over which one device is able to communicate data to another device.

Referring again to FIG. 5, processing system 118 is coupled to data storage system 104. Processing system 118 reads computer-executable instructions (e.g., 121, 122) from data storage system 104 and executes the computer-executable instructions. Execution of the computer-executable instructions by processing system 118 configures and/or causes computing device 102 to perform the actions indicated by the computer-executable instructions. For example, execution of the computer-executable instructions by processing system 108 can configure and/or cause computing device 102 to provide Basic Input/Output Systems (BIOS), operating systems, system programs, application programs, or can configure and/or cause computing device 102 to provide other functionality.

Processing system 118 reads the computer-executable instructions from one or more computer-readable media. For example, processing system 118 reads and executes computer-executable instructions 121 and 122 stored on memory 108 and secondary storage system 106.

Processing system 118 comprises one or more processing units 126. Processing units 126 comprise physical devices that execute computer-executable instructions. Processing system 118 can also include one or more operating systems that are executable by computing device 102. Processing units 126 comprise various types of physical devices that execute computer-executable instructions. For example, one or more of processing units 126 comprise a microprocessor, a processing core within a microprocessor, a digital signal processor, a graphics processing unit, or another type of physical device that executes computer-executable instructions.

Input interface 110 enables computing device 102 to receive input from an input device 128. Input device 128 comprises a device that receives input from a user. Input device 128 comprises one or more various types of devices that receive input from users. For example, input device 128 comprises a keyboard, a touch screen, a mouse, a microphone, a keypad, a joystick, a brain-computer interface device, or another type of device that receives input from a user. In some examples, input device 128 is integrated into a housing of computing device 102. In other examples, input device 128 is outside a housing of computing device 102. In some examples, input device 128 receives report requests, POG data, and/or other types of data as described above.

Output interface 112 enables computing device 102 to output information on one or more output devices 130. One or more output devices 130, in some examples, are configured to provide output to a user using tactile, audio, or video output. For example, an output device 130 is a device that displays output. Example types of display devices include monitors, touch screens, display screens, televisions, and other types of devices that display output. In some examples, output device 130 is integrated into a housing of computing device 102. In other examples, output device 130 is outside a housing of computing device 102. Output devices 130, in one example, includes a presence-sensitive screen or a touch screen. Output devices 130 can utilize a sound card, a video graphics adapter card, or any other type of device for converting a signal into an appropriate form understandable to humans or machines. Additional examples of output device 130 include a speaker, a cathode ray tube (CRT) monitor, a liquid crystal display (LCD), or any other type of device that can generate intelligible output to a user.

Communication interface 114 enables computing device 102 to send and receive data over one or more communication media. In some examples, computing device 102 utilizes one or more communication interfaces 114 to wirelessly communicate with an external device such as server device or a client device, a mobile phone, or other networked computing device. Communication interface 114 comprises various types of devices. For example, communication interface 114 comprises a Network Interface Card (NIC), a wireless network adapter, a Universal Serial Bus (USB) port, or another type of device that enables computing device 102 to send and receive data over one or more communication media. In some examples, communications interface 114 comprises a network interface to communicate with external devices via one or more networks, such as one or more wireless networks. Examples of communications interface 114 are an Ethernet card, an optical transceiver, a radio frequency transceiver, or any other type of device that can send and receive information. Other examples of such network interfaces include Bluetooth®, 3G and Wi-Fi® radios in mobile computing devices. In some examples, communication interface 114 receives configuration data, trial data, and/or other types of data as described above. Furthermore, in some examples, communication interface 114 outputs information and/or other types of data as described above.

Computing device 102, in some examples, includes one or more power sources 132, which may be rechargeable and provide power to computing device 102. In some examples, the one or more power sources 132 are one or more batteries. The one or more batteries could be made from nickel-cadmium, lithium-ion, or any other suitable material. In another example, the one or more power sources 132 include a power supply connection that receives power from a power source external to computing device 102.

The techniques described herein may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described herein may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A system using augmented reality to facilitate a planogram (POG) reset in a retail environment, the system comprising:
   a location benchmark associated with an area of the retail environment including a plurality of retail displays;
   a display generator located relative to the location benchmark, the display generator displaying an image corresponding to the POG reset on one of the retail displays;
   a control processor communicating with the display generator and driving the display generator to display the image; and
   a data source communicating with the control processor, the data source being a computer device that provides control signals to the control processor based on pre-stored POG data,
   wherein the control processor is programmed to identify a specific location of the display generator in the retail environment based on the relative position of the location benchmark.

2. The system according to claim 1, wherein the location benchmark comprises a keystone positioned in an aisle in the retail environment.

3. The system according to claim 1, wherein the location benchmark comprises a marker in a corner of an aisle in the retail environment.

4. The system according to claim 3, wherein the control processor and the display generator modify the image based on a position of the marker relative to the display generator to fit the retail display.

5. The system according to claim 1, wherein the display generator comprises an LED projector.

6. The system according to claim 1, wherein the display generator comprises a wearable device.

7. The system according to claim 1, wherein the image on the retail display comprises peg indicators positioned over peg holes on the retail display that receive a peg.

8. The system according to claim 7, wherein the image on the retail display further comprises shelf indicators positioned over peg holes or shelf slots on the retail display that receive a shelf.

9. The system according to claim 1, wherein the display generator comprises an LED projector.

10. A system using augmented reality to facilitate a planogram (POG) reset for a retail display in a retail environment, the system comprising:
    a data source including a computer device, the data source storing POG data and outputting control signals corresponding to the POG data;
    a control processor in communication with the data source and receiving the control signals from the data source;

a display generator in communication with the control processor, the control processor determining a position of the display generator in the retail environment and driving the display generator according to the display generator position to display an image corresponding to the POG reset on the retail display, wherein the image on the retail display includes at least one of peg indicators positioned over peg holes on the retail display that receive a peg, shelf indicators positioned over peg holes or shelf slots on the retail display that receive a shelf, and product indicators positioned adjacent pegs or shelves that identify product locations on the pegs or shelves, respectively.

11. The system according to claim 10, further comprising a location benchmark, wherein the display generator is positioned relative to the location benchmark.

12. The system according to claim 11, wherein the location benchmark comprises a marker in a corner of an aisle in the retail environment.

13. The system according to claim 12, wherein the control processor and the display generator modify the image based on a position of the marker relative to the display generator to fit the retail display.

14. A method of resetting a retail display in a retail environment according to a planogram (POG) reset using augmented reality, the method comprising:

positioning a display generator adjacent a retail display;

providing control signals from a data source to a control processor based on pre-stored POG data;

the control processor identifying a position of the display generator in the retail environment based on a position of a location benchmark, which is associated with an area of the retail environment;

driving the display generator with the control processor;

the display generator displaying an image corresponding to the POG reset on the retail display; and placing at least one of pegs and shelves on the retail display in accordance with the image displayed on the retail display.

15. The method according to claim 14, further comprising modifying the image based on the position of the location benchmark relative to the display generator to fit the retail display.

16. The method according to claim 14, further comprising modifying the image to fit the retail display based on a position of the display generator relative to the retail display.

17. The method according to claim 14, wherein displaying an image comprises displaying peg indicators over peg holes on the retail display that receive a peg.

18. The method according to claim 17, wherein displaying an image comprises displaying shelf indicators positioned over peg holes or shelf slots on the retail display that receive a shelf.

* * * * *